US012338086B1

(12) United States Patent
Desai et al.

(10) Patent No.: US 12,338,086 B1
(45) Date of Patent: Jun. 24, 2025

(54) CONTAINER UNLOADING SYSTEMS FOR VARIOUS CONTAINER TYPES

(71) Applicant: Amazon Technologies, Inc., Seattle, WA (US)

(72) Inventors: Jainil Nilesh Desai, Schaumburg, IL (US); Ashwini Kotraiah Davangere, Frisco, TX (US); Larissa Del Toro Sanchez, Marietta, GA (US); Andrew Loyd Robinson, Nashville, TN (US); Kaushal Bharatkumar Mehta, Seattle, WA (US); Vishnu Priya Ramineni, Slidell, LA (US); Dean Christopher Blanchard, Howell, MI (US)

(73) Assignee: Amazon Technologies, Inc., Seattle, WA (US)

( * ) Notice: Subject to any disclaimer, the term of this patent is extended or adjusted under 35 U.S.C. 154(b) by 756 days.

(21) Appl. No.: 17/694,118

(22) Filed: Mar. 14, 2022

(51) Int. Cl.
*B65G 65/00* (2006.01)
(52) U.S. Cl.
CPC ................... *B65G 65/005* (2013.01)
(58) Field of Classification Search
CPC .................................................. B65G 65/005
See application file for complete search history.

(56) References Cited

U.S. PATENT DOCUMENTS

| 4,343,587 | A  | * | 8/1982  | Aidlin ..... | B65G 47/74 198/409 |
|---|---|---|---|---|---|
| 6,558,103 | B2 | * | 5/2003  | Lilley ..... | B65G 65/23 414/265 |
| 6,913,431 | B2 | * | 7/2005  | Lilley ..... | B65G 65/23 414/420 |
| 2009/0301357 | A1 | * | 12/2009 | Fourney ..... | B65G 59/08 108/50.11 |
| 2019/0322475 | A1 | * | 10/2019 | Hartmann ..... | B65G 65/23 |
| 2023/0080709 | A1 | * | 3/2023  | Gabrieli ..... | B65G 47/962 198/478.1 |

* cited by examiner

*Primary Examiner* — Kyle O Logan
(74) *Attorney, Agent, or Firm* — Eversheds Sutherland (US) LLP

(57) ABSTRACT

Systems and methods are disclosed for unloading containers of various container types. In one embodiment, an example container unloading system may include a container support platform configured to rotate a container from an upright position to an angled position, a centering guide configured to guide the container onto the container support platform, a hydraulic device configured to actuate the container support platform, and a controller configured to determine presence of the container on the container support platform, and cause the container support platform to rotate the container via actuation of the side-mounted hydraulic device.

20 Claims, 9 Drawing Sheets

CONTAINER UNLOADING SYSTEMS FOR VARIOUS CONTAINER TYPES

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that throughput can be increased and sustainability can be improved.

Figure 1:
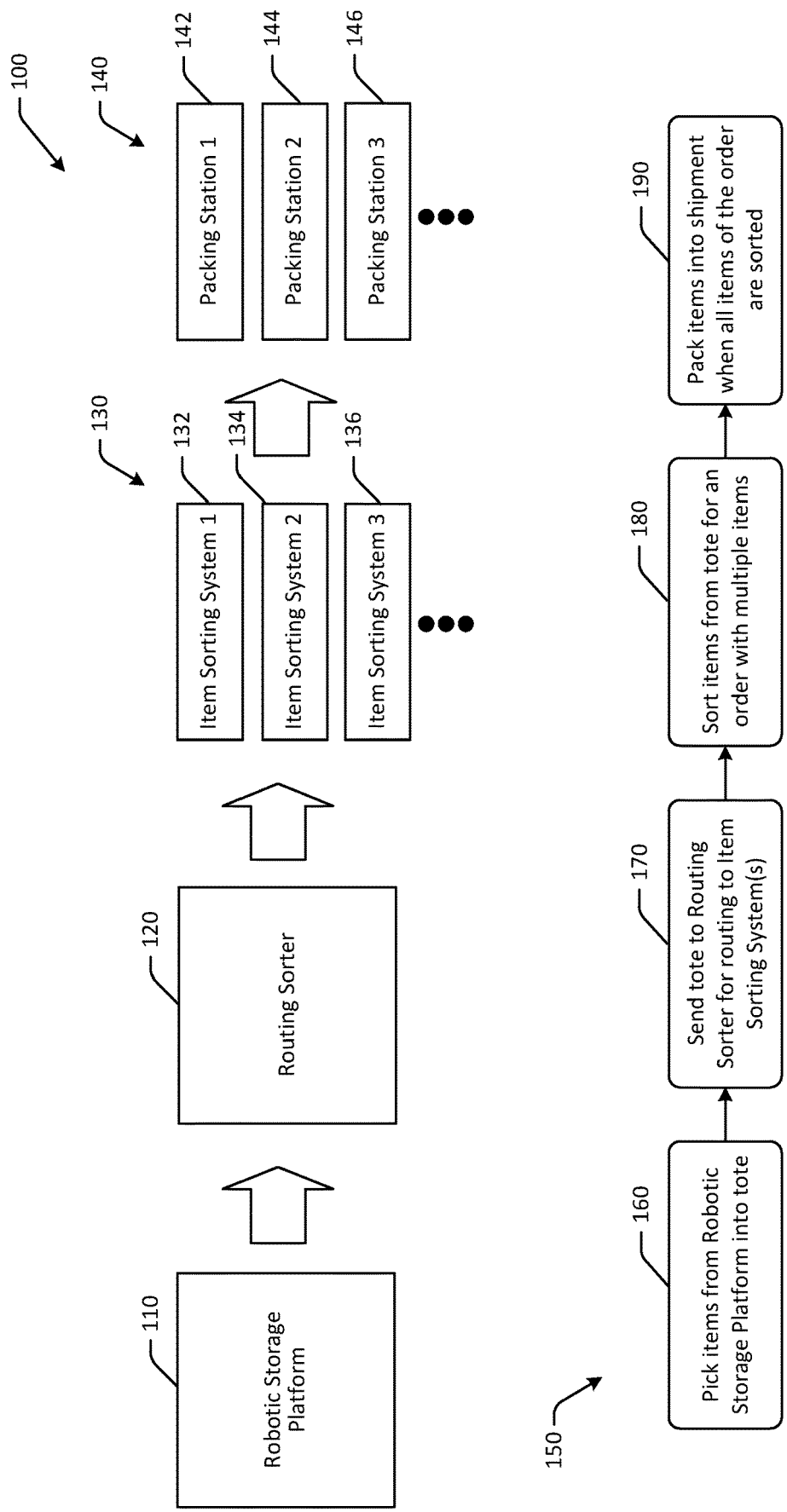
FIG. 1 is a hybrid schematic illustration of an example use case for container unloading systems for various container types and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products and/or shipping of packages in an order may be time consuming.

In some instances, orders for products may include multiple items. For example, a user may place an order for two or more products. In such instances, the products that are ordered may not be in the same location of the fulfillment center, or one of the products may take a longer time to obtain or pick than the others. As a result, packing of the order may be delayed until all of the items in the order are ready for packing. To improve the speed of processing orders, in certain instances, robots and other technology may be deployed, such that manual efforts can be redirected to other tasks. For example, robots may be used to assist with locating products in an order during a pick process. However, directing picked products to the appropriate packing station and/or location may form a bottleneck in the operation of the fulfillment center. For example, after products are picked, the products may be placed in a container, such as a tote or other container, and directed to sortation machines to direct the picked products to the appropriate packing location. Products in the same order may be directed to the same packing location for consolidation and subsequent packing. However, a tote or other container may include products that are to be sorted to multiple different packing locations, and the sortation process may be slowed by sheer volume of products that are to be processed and/or sorted. In addition, in some instances, items that are part of the same order may not all be in the same fulfillment center or other location. For example, a first product in an order of two items may be at a first fulfillment center, and a second product in the same order may be at a second fulfillment center. In such instances, instead of shipping the two items in the order separately, such as one from each fulfillment center, items may be transferred from one fulfillment center to another, and then aggregated with other items in the order and shipped together. Such fulfillment center-to-fulfillment center transfers of items may be processed similar to items that are to be shipped to consumers. For example, the items to be transferred may be picked, routed to a sortation machine, sorted into a particular container (e.g., a container designated for a particular fulfillment center, etc.), packed, and sent. In some instances, containers destined for other fulfillment centers may be infinite bottom containers, or containers that may be filled without consideration of a level of fullness or remaining capacity of the container. In such instances, capacity of the containers may be monitored externally (e.g., by a user manually, by a camera system automatically, using different sensors, etc.). Full containers may be removed from a sortation system and replaced with an empty container to continue aggregating items destined for a fulfillment center.

As items are placed into containers or packages for transport, sortation, etc., the packages may be placed in containers, such as foldable carts, Gaylords, cardboard containers, and/or other container types that are configured to hold a plurality of packages. For example, a foldable cart may be filled with packages that are destined for another fulfillment center or other facility. The foldable carts and other containers described herein may be used not only to store packages or other items, but may also be used to transport the packages to another facility. For example, in some embodiments, the foldable containers may be filled with packages, and the filled foldable container may be loaded onto a truck and transported to another facility. This may allow for increased efficiency and reduced handling of individual packages, and may also provide the ability for foldable containers to be used across any number of facilities and/or workstations within a facility.

Once the foldable container is unloaded from a truck, or otherwise reaches its destination within a facility (e.g., if the container does not leave a facility, etc.), containers may be unloaded or dumped so as to remove its contents (e.g., from its open top, etc.). For example, a Gaylord may be unloaded by dumping its contents onto a conveyor or other surface. Likewise, other container types, such as cardboard containers, foldable carts, and so forth may be dumped onto a conveyor or other surface, such that the packages or other items inside the container fall onto the conveyor. Containers may be dumped manually (e.g., using equipment, etc.) or automatically. However, typically, different types of containers may need different types of specialized unloading equipment. For example, one container unloading system may be used for carts, and another unloading system may be used for cardboard containers, due to differences in the container structures. As a result, container unloading systems may consume space in a facility. In addition, depending on the configuration of the container, during the dumping process, some packages may jam, get stuck, or otherwise fail to fall from the container onto the conveyor. This may cause a need for manual intervention, jam clearing, repeated back-and-forth movement of the foldable container, and so forth to dump the packages, thereby causing downstream delays.

Embodiments of the disclosure include container unloading systems for various container types. For example, embodiments of the disclosure include container unloading systems that can accommodate multiple different types of containers, such as carts, boxes, Gaylords, and other types of containers, thereby eliminating the need for specific dumpers for each container type. In addition, the container unloading systems may automatically detect a container type and execute different unloading sequences based on container type, so as to reduce a likelihood of jams during the container unloading process. Some embodiments include automatic retention mechanisms to further reduce manual operation and increase automation of the unloading process. Embodiments further reduce pinch points, reduce container tipping and stability issues, and provide increased space for container manipulation. Embodiments may therefore increase throughput and speed of consolidating items for multi-item orders and/or consolidating packages that are destined for certain related destinations, such as other fulfillment centers. Some embodiments include optimized process flows for processing of orders at fulfillment centers, as well as process flows or equipment to increase speed of consolidating products in a multi-item order and/or speed of sorting packages. As a result, throughput of fulfillment centers may be improved, and/or logistics of fulfillment center operations may be less complicated.

Referring to FIG. 1, an example use case 100 for container unloading systems for various container types and an example process flow in accordance with one or more embodiments of the disclosure. Although discussed in the context of online orders, other embodiments may be directed to any suitable use case where products are picked and sorted, or packages are sorted, such as instances where users may pick up orders rather than receiving a shipment, instances where items are aggregated for transport to another fulfillment center, and so forth.

In FIG. 1, a fulfillment center may include a robotic storage platform 110, a routing sorter 120, one or more item sorting systems 130, and one or more packing stations 140. The robotic storage platform 110 may be a portion of the fulfillment center at which products picked from product inventory are placed. Inventory may be stored in containers in foldable containers in some instances. Robots may be used to pick products from inventory and to deliver to the robotic storage platform in some instances, while in other instances, manual effort or a combination thereof may be used to pick products. The picking process at the robotic storage platform may include locating a product in an order, obtaining the product, and sending the product to the robotic storage platform 110, such as via a conveyor belt. In the illustrated embodiment, products at the robotic storage platform 110 may be placed in a container, such as a tote. The tote may be assigned to, or otherwise associated with, a particular item sorting system machine in some instances. For example, a certain tote may be associated with a certain item sorting system, such that products that are designated to be picked and placed in the tote are for orders that are to be consolidated at that particular item sorting system. The association between the tote and the item sorting system may be static in some instances. In other embodiments, there may not be any association between totes and item sorting systems, or associations may be dynamic.

At the routing sorter 120, totes including products that have been picked may be routed to the appropriate or designated item sorting system. For example, the routing sorter 120 may optionally determine an identifier associated with the tote, and may determine one or more item sorting systems to which the tote is to be routed using the identifier or using another factor, such as sortation system load. The routing sorter 120 may route or direct the tote to an item sorting system.

The item sorting systems 130 may include one or more item sorting system machines. In FIG. 1, a first item sorting system 132, a second item sorting system 134, a third item sorting system 136, and so forth may be included. Any number of item sorting systems may be included. Some or all of the item sorting systems may optionally be associated with certain totes. The item sorting systems may be used to consolidate or otherwise aggregate products for single or multi-item orders and/or for transfer to a different fulfillment center. For example, a first tote may include a first item of a multi-item order, and a second tote may include a second item of the multi-item order. The item sorting system may therefore identify the orders associated with the respective products in a tote, and may transport the products to a container, such as a tote, a flexible container, a specific chute leading to a container, or a different container associated with the order. When the order is complete with all of the products in the associated chute or container, the order may be packed. In instances where a container is designated for a different fulfillment center, as opposed to an online order, the container may be packed when full, as opposed to when certain items are placed into the container (e.g., there may not be any specific items that need to be in the container before packing, rather, the container may just be a certain threshold full, etc.). Accordingly, a specific item sorting system may be designated for fulfillment of a particular multi-item order. As a result, all of the products in the multi-item order may be placed in totes that are directed to that particular item sorting system. At the item sorting systems 130, totes that are received via the routing sorter 120 may be emptied, and the products in the respective totes may be transported to the appropriate chutes or containers for the orders for which the products were picked.

After a single or multi-item order is complete (e.g., the item sorting system has delivered all of the products in the order to the appropriate chute, container, etc.), or when a container designated for another fulfillment center is full (where full is a configurable threshold, such as about 60% full capacity, 70% full capacity, 80% full capacity, 90% full capacity, etc.), the order may be packed at the packing station 140. In some embodiments, one or more packing stations may be included. In some instances, a packing station may service more than one item sorting system, while in other instances, more than one packing station may service one item sorting system. In the illustration of FIG. 1, a first packing station 142 may be used to pack orders from the first item sorting system 132, a second packing station 144 may be used to pack orders from the second item sorting system 134, a third packing station 146 may be used to pack orders from the third item sorting system 136, and so forth. At the packing stations 140, the orders may be placed into boxes and sealed for subsequent shipment. The packages may then be processed for shipment to the user. For example, the packages may be placed into foldable containers for shipment to another fulfillment center, a sort center, or another facility. At the subsequent facility, the foldable container may be dumped to remove its contents. At various points throughout the facility, totes, carts, boxes, Gaylords, and/or other types of containers may be unloaded by the container unloading systems described herein.

At the fulfillment center, an example process flow 150 illustrated in FIG. 1 may be implemented to improve the efficiency and/or throughput of the fulfillment center. At a first block 160, items may be picked from the robotic storage platform 110 into a tote that may optionally be associated with a specific item sorting system. At a second block 170, the tote may be sent to the routing sorter 120 for routing to an item sorting system. At a third block 180, the items from the tote may be sorted for an order with multiple item by the specific item sorting system. At a fourth block 190, the items may be packed into a shipment when all of the items in the order are sorted.

Figure 2:
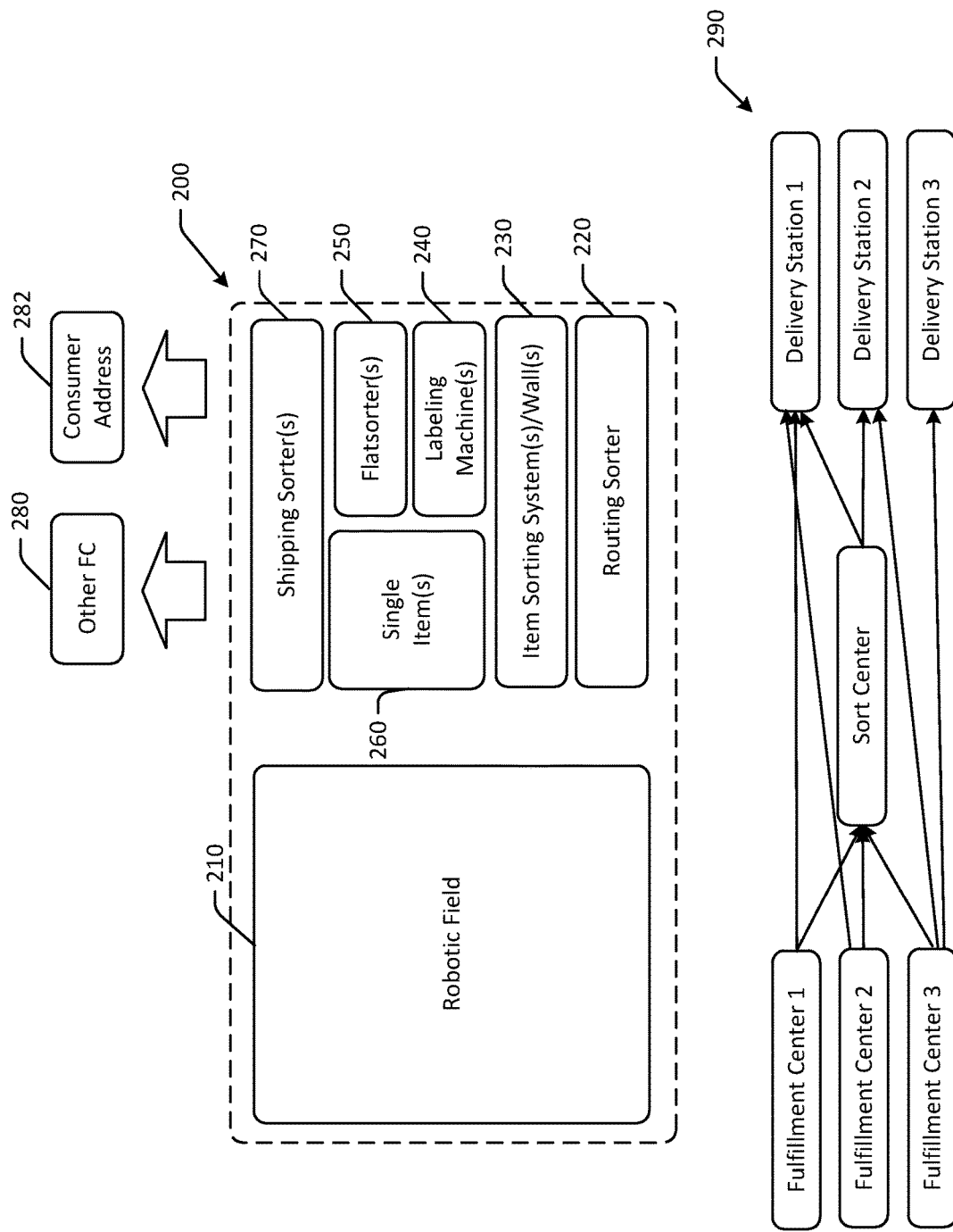
FIG. 2 is a hybrid schematic illustration of an example use case for container unloading systems for various container types throughout a facility in accordance with one or more embodiments of the disclosure.

FIG. 2 is a hybrid schematic illustration of an example use case for container unloading systems for various container types throughout a facility in accordance with one or more embodiments of the disclosure. Other embodiments may include additional or fewer components.

In FIG. 2, an example layout of a fulfillment center 200 is depicted. The fulfillment center 200 may include a robotic field 210 at which product inventory may be stored for picking (e.g., optionally in one or more flexible container pods, etc.), one or more routing sorters 220 that may be used to direct totes or other containers to item sorting systems, one or more item sorting systems or walls 230 used to consolidate products for multi-item orders and/or to pack multi-item orders, one or more single item sections 260 that may be used to pack single item orders, one or more labeling machines 240 that may be used to apply shipping labels to packages, one or more flat sorters 250 and shipping sorters 270 to sort labeled shipments (e.g., by destination, carrier, etc.) for pickup from the fulfillment center 200.

In some embodiments, the item sorting systems described herein may be a part of the flat sorters 250, where the item sorting systems may be configured to sort packages into containers or chutes. In such embodiments, the item sorting systems may or may not also be used at the item sorting systems 230 portion of the fulfillment center 200. Accordingly, the item sorting systems may be disposed at, or otherwise coupled to, a cross belt conveyor system, such as the flat sorters 250 of the fulfillment center 200.

The item sorting system machines 230 may include containers and/or containers of different sizes (e.g., small, medium, large, etc.) and may be configured, in one example, to handle items that weigh up to twenty or more pounds (e.g., 100 pounds or more, etc.). In some embodiments, the item sorting system machines 230 may include multiple chutes, such as about 328 chutes, and may be configured to sort items at a rate of about 2,100 units per hour or more. In some instances, the item sorting system machines 230 may have two inductors (e.g., one on each side, etc.), and may be modular. For example, the item sorting system machines 230 may each include sixteen expansion modules, where expansion modules may be defined as three two-sided columns next to one another for a total length of about 80 feet. The item sorting system machines 230 may reduce labor and capital costs associated with processing orders.

In some embodiments, the item sorting system 230 may replace other processes, such as manual processes. The item sorting system 230 may be a cross-belt shuttle sorter that sorts singulated products into containers or totes. Item sorting systems 230 may be capable of sorting at a rate of 2,100 units per hour or more. Certain item sorting systems 230 may be configured to handle items of up to twenty pounds, or more in some instances, with dimensions of about 18"×14"×8" or greater, which may cover almost all products at the fulfillment center 200. The item sorting systems 230 may operate as a high-speed, high-destination sort solution that intakes items or packages and sorts them into containers using a shuttle that travels vertically and horizontally inside the machine (or outside in some instances).

Individual item sorting system machines may be item sorting systems, and may include a number of, such as two or more, modular sorting machines coupled in series, or otherwise adjacent to each other and connected. The modular sorting machines may include a first modular sorting machine. The modular sorting machines may be configured to singulate items from a tote including a plurality of items into a plurality of chutes or containers (e.g. induct individual items from a container that has multiple items, and place the inducted items into the appropriate chute to be routed to a container, where chutes or containers are associated with multi-item orders). The tote from which items are inducted may be associated with the individual item sorting system machine (e.g., the modular sorting machines that form the individual item sorting system machine, etc.). In some embodiments, item sorting systems or individual item sorting machines may be configured to induct and sort packages based at least in part on a destination of the respective packages. Destinations may be internal destinations within a fulfillment center, external destinations to geographic regions or addresses, or other destination types. For example, output from the fulfillment center 200 may include containers of items routed to other fulfillment centers 280, packages addressed to consumer addresses 282, and so forth.

Accordingly, in some embodiments, item sorting systems may be arranged in rows and may receive totes from a routing sorter, thereby streamlining fulfillment center operation and reducing labor and space costs. The item sorting systems may process totes for multi-order sortation and consolidation. As a result, there may no longer be a need to singulate and send items to a wall for manual extraction, because each tote may be assigned to a particular item sorting system machine. Induct stations can be replaced with item sorting system machines.

In another embodiment, pickers may pick items directly to a segmented belt conveyor at a station that may be near an item sorting system machine. Other nearby pick stations may also pick items directly to conveyance for the same item sorting system machine. Picked items being transported to a single item sorting system machine may merge together to be inducted into their unique item sorting system machine, where multi-item orders may be consolidated and sent to packing.

Some embodiments may be used across facilities in a fulfillment network. An example fulfillment network 290 is depicted in FIG. 2. The fulfillment network 290 may include a number of fulfillment centers, a number of sort centers, a number of delivery stations, and so forth. The fulfillment centers may be used to pack items for fulfillment. Packed items may be routed to a sort center for redirection to an appropriate delivery station. In some instances, packed items may be routed directly to a delivery station while bypassing sort centers. Embodiments of the foldable containers described herein may be configured to move from a first facility to a second facility, a third facility, and so on, so as to seamlessly move amongst different facilities in a fulfillment network. For example, a container may move from a fulfillment center to a sort center, and then on to a delivery station or other facility, thereby providing a flexible and dynamic solution. At various points along the network of facilities, containers may be unloaded using the container unloading systems described herein.

Embodiments of the disclosure include container unloading systems for various container types. The container unloading systems may be configured to unload more than one container type, and may be configured to automatically detect a container type and execute a container-specific unloading sequence of operations. Certain embodiments may improve processing speed and/or throughput of fulfillment centers. Certain embodiments may improve performance of mechanical equipment for sortation and/or consolidation of items for multi-item orders. While described in the context of online orders, aspects of this disclosure are more broadly applicable to other forms of product sortation.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 3:
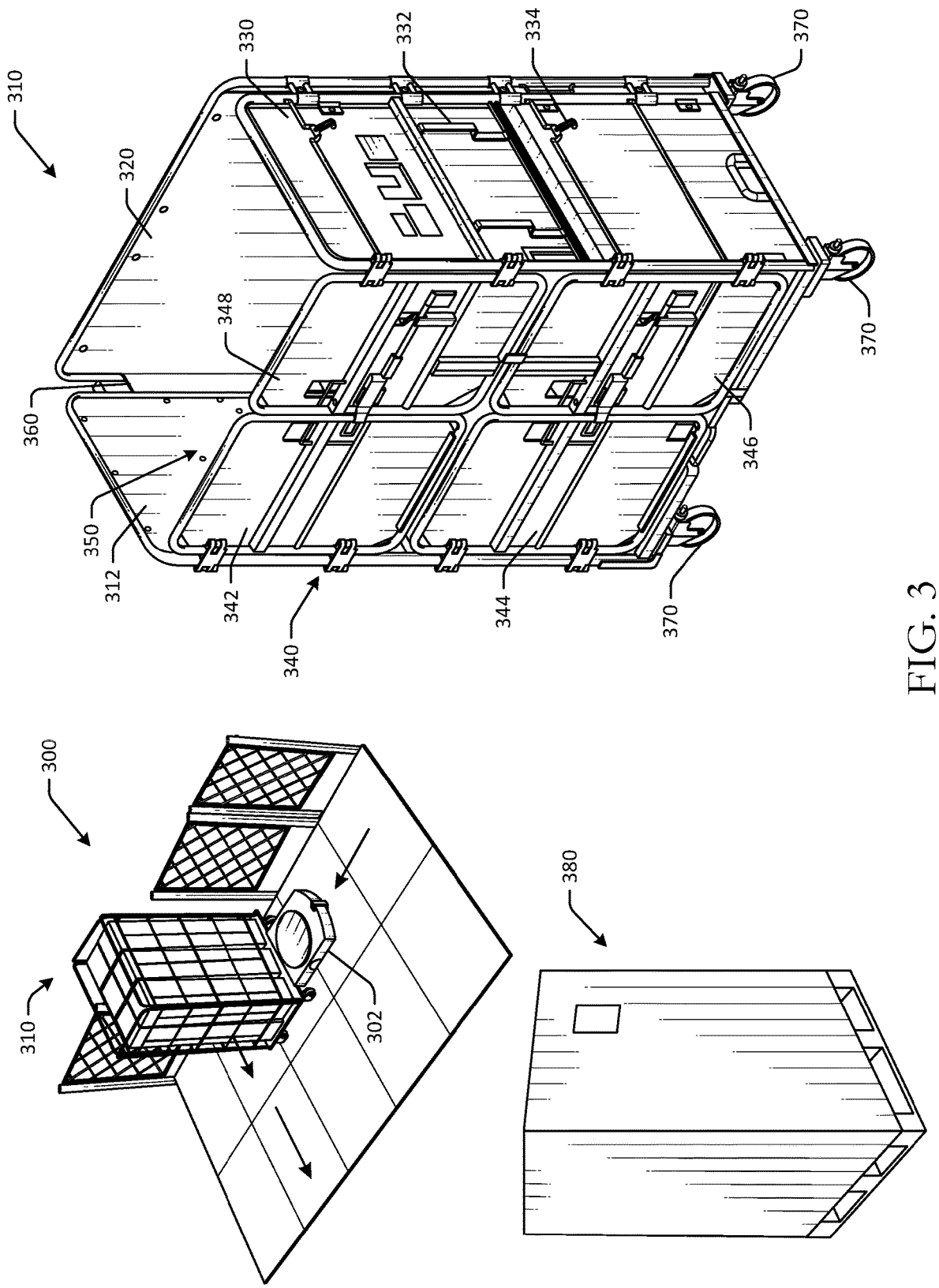
FIG. 3 is a schematic illustration of a container being transported using an autonomous robot, and various examples of container types.

FIG. 3 is a schematic illustration of a container being transported using an autonomous robot, and various examples of container types. Other embodiments may include additional or fewer components. The illustration of FIG. 3 is not to scale, and may not be illustrated to scale with respect to other figures. Container types in addition to, or other than, those shown in the example of FIG. 3 may be unloaded using the container unloading systems described herein.

In the example of FIG. 3, a cart, such as a foldable container 310, may be positioned in an environment 300, such as a fulfillment center floor, a warehouse environment, or another environment. Various types of containers, such as the foldable container 310, a Gaylord or other type of cardboard container 380, and other types of containers may be unloaded using the container unloading systems described herein.

The foldable container 310 may have one or more mesh sidewalls in some embodiments. In other embodiments, the foldable container 310 may have solid sidewalls. To move throughout the environment 300, the foldable container 310 may be rolled using one or more wheels. For example, a manual operator may move the foldable container 310 by pushing or pulling the foldable container 310 from one location to another. The foldable container 310 may receive, carry, and transport various packages, boxes, items, products, or other objects of various types. In addition, the foldable container 310 may be configured to be lifted, carried, moved, and placed between positions within a material handling facility by robotic drive units, such as the robot 302, or other material handling equipment. In this manner, the foldable container 310 can be pushed by associates on surfaces, e.g., sort center floors, and the foldable container 310 can also be carried and transported by robotic drive units or robots 302.

The foldable container 310 may also be moved using the robot 302, such as an autonomous robot. For example, the robot 302 may be configured to tunnel or otherwise position itself underneath the foldable container 310. The robot 302 may then lift the foldable container 310 off the ground, such that the wheels are separated from the ground, and the robot 302 may then transport the foldable container 310 from one location to another.

The foldable container 310 may maintain the ability to be moved by humans and robots, while also maintaining the ability to fold from a rectangular configuration to an L-shaped folded configuration. The foldable container 310 may include a locking bottom container platform that provides structural rigidity to enable lifting by the robot 302, while also providing the ability for the foldable container 310 to fold.

Accordingly, the foldable container 310 may be configured to be transported using both (i) the one or more, or plurality, of wheels via manual pushing, and (ii) robotic manipulation to lift and move the foldable container 310, such as by the robot 302. The foldable container 310 may be configured to allow an autonomous robot, such as the robot 302, to tunnel underneath a bottom container platform of the foldable container 310. The foldable container 310 may be configured to be lifted from the bottom container platform by an autonomous robot or other robot 302 that is positioned at least partially or entirely underneath a center or middle portion of the foldable container 310 when the foldable container 310 is in the unfolded position (e.g., a rectangular configuration, etc.).

The wheels may include one or more freely-rotating swivel casters associated with a bottom surface of the foldable container 310. For example, the foldable container 310 may include four freely-rotating swivel casters, with one positioned at each corner of the foldable container 310. In some examples, two of the four casters may have a swivel locking feature, such as a manually or foot-operated swivel locking feature, and the other two of the four casters may have a caster rotation locking feature, such as a manually or foot-operated caster rotation locking feature.

One example of a container type that can be unloaded by the container unloading systems described herein is the Gaylord 380 (which may or may not be disposed on a pallet), and another example is the foldable container 310. The foldable container 310 may include a first sidewall 312, a rear wall 320, a second sidewall 330, and front doors 340. Some or all of the walls may be formed of panels, such as plastic panels, and may include various types of plastic or other components. For example, some portions of some or all of the walls may include plastic or other materials that are configured to facilitate sensing or other detection of contents loaded in the foldable container 310. One or more of the walls may be transparent, so as to provide visibility into the contents of the foldable container 310. The panels may be smooth and flat, so as to allow items to move smoothly along the panels. The foldable container 310 may have a greater cross-sectional area (e.g., from a top cross-sectional perspective, a side cross-sectional perspective, etc.) at or near a bottom or lower portion of the foldable container 310 than at or near a top or upper portion of the foldable container 310. This may provide a funnel-like effect when dumping items out of the foldable container 310, so as to improve item flow and reduce a likelihood for jams. The four walls of the foldable container 310 may form a rectangular configuration when the foldable container 310 is in an unfolded configuration. Accordingly, items, such as packages, may be disposed in an inside portion 450 of the foldable container 310 when the foldable container 310 is in the unfolded position. The foldable container 310 may include one or more wheels 370 that allow the foldable container 310 to be manually pushed and/or pulled.

The rear wall 420 may include one or more lips 360 that extend from the rear panel and cover a joint between the first sidewall 312 and the rear wall 320, and/or a joint between the second sidewall 330 and the rear wall 320. The lip 360 may prevent packages or other items from getting caught or pinched between the walls of the container. The lip(s) may include a second smooth panel extension disposed perpendicular to the first flat portion, where the second smooth panel extension covers at least a portion of the second joint.

The second sidewall 330 may include one or more ergonomic handles 332 that are disposed on an outer side of the panel(s) of the second sidewall 330. The ergonomic handles 332 may be formed so as to not extend beyond a frame of the second sidewall 330, and may be disposed relatively higher than a jog formed in the panel of the second sidewall 330. This may be possible due to the jog creating space for the ergonomic handles 332. A hook 334 or other coupling mechanism to couple foldable containers together may be coupled to the second sidewall 330. The second sidewall 330 may be configured to rotate with respect to the rear wall 420.

A fixed hinge or other mechanism may be disposed at a connection between the first sidewall 312 and the rear wall 320. In some embodiments, electronic devices, such as tracking devices, may be coupled to the foldable container 310 at or near the fixed hinge, or elsewhere on the foldable container 310. For example, some embodiments may include Bluetooth-based devices that are configured to provide location data, or data that may be used to locate a particular foldable container, disposed at or near the fixed hinge. Other embodiments may include RFID devices, NFC devices, or other transceiver components that can be used to provide positioning data for a foldable container. Such data may be used to identify the location of a foldable container inside a facility.

The front doors 340 may be formed of one or more panels. For example, the front doors 340 may include a first panel 342 and a second panel 344 that form a first door. The first panel 342 and the second panel 344 may be coupled to the first sidewall 312. The first panel 342 and the second panel 344 may be coupled to one another or may be decoupled, such that the first panel 342 may rotate with respect to the second panel 344. The first panel 342 and the second panel 344 may be configured to rotate with respect to the first sidewall 312. For example, the first panel 342 and the second panel 344 may be configured to rotate until parallel with the first sidewall 312.

The front doors 340 may include a third panel 348 and a fourth panel 346 that form a second door. The third panel 348 and a fourth panel 346 may be coupled to the second sidewall 330. The third panel 348 and a fourth panel 346 may be coupled to one another or may be decoupled, such that the third panel 348 may rotate with respect to the fourth panel 346. The third panel 348 and a fourth panel 346 may be configured to rotate with respect to the second sidewall 330. For example, the third panel 348 and a fourth panel 346 may be configured to rotate until parallel with the second sidewall 330.

The wheels 370 may be self-positioning swivel casters may have associated home positions that may be defined positions or orientations of the swivel casters when lifted, stationary, and/or stopped. For example, the home positions of self-positioning swivel casters associated with a container, cart, or other material handling equipment may increase or maximize space or clearance under the cart when the cart is stationary or stopped. In some example embodiments, robotic drive units or other types of material handling equipment, e.g., manual, automated, or robotic equipment, may be inserted or placed under the cart and between the self-positioning swivel casters, such that increasing or maximizing space or clearance under the cart and between the self-positioning swivel casters may facilitate reliable operations and prevent collisions or interferences between robotic drive units and portions of the cart. In other example embodiments, the home positions of self-positioning swivel casters associated with a container, cart, or other material handling equipment may be positioned substantially within an outer periphery, dimensions, or footprint associated with a receptacle of the cart when the cart is stationary or stopped, such that a plurality of carts may be positioned or stored adjacent to each other with minimal gap or clearance therebetween and without causing interference between respective swivel casters associated with adjacent carts. In addition, the home positions of self-positioning swivel casters associated with a cart or other material handling equipment may enable a cart to substantially remain in position when lifted, stationary, or stopped. For example, a cart may be placed at a position on a substantially flat or horizontal floor or other surface of a material handling facility. However, due to irregularities, imperfections, protrusions, indentations, edges, slopes, angles, cracks, debris, or other surface characteristics associated with the surface, a cart that is stationary or stopped may move or drift, e.g., due to gravity. The home positions of self-positioning swivel casters may be selected or configured to prevent such movement or drift of a cart due to surface characteristics associated with a position at which the cart is placed.

Figure 4A:
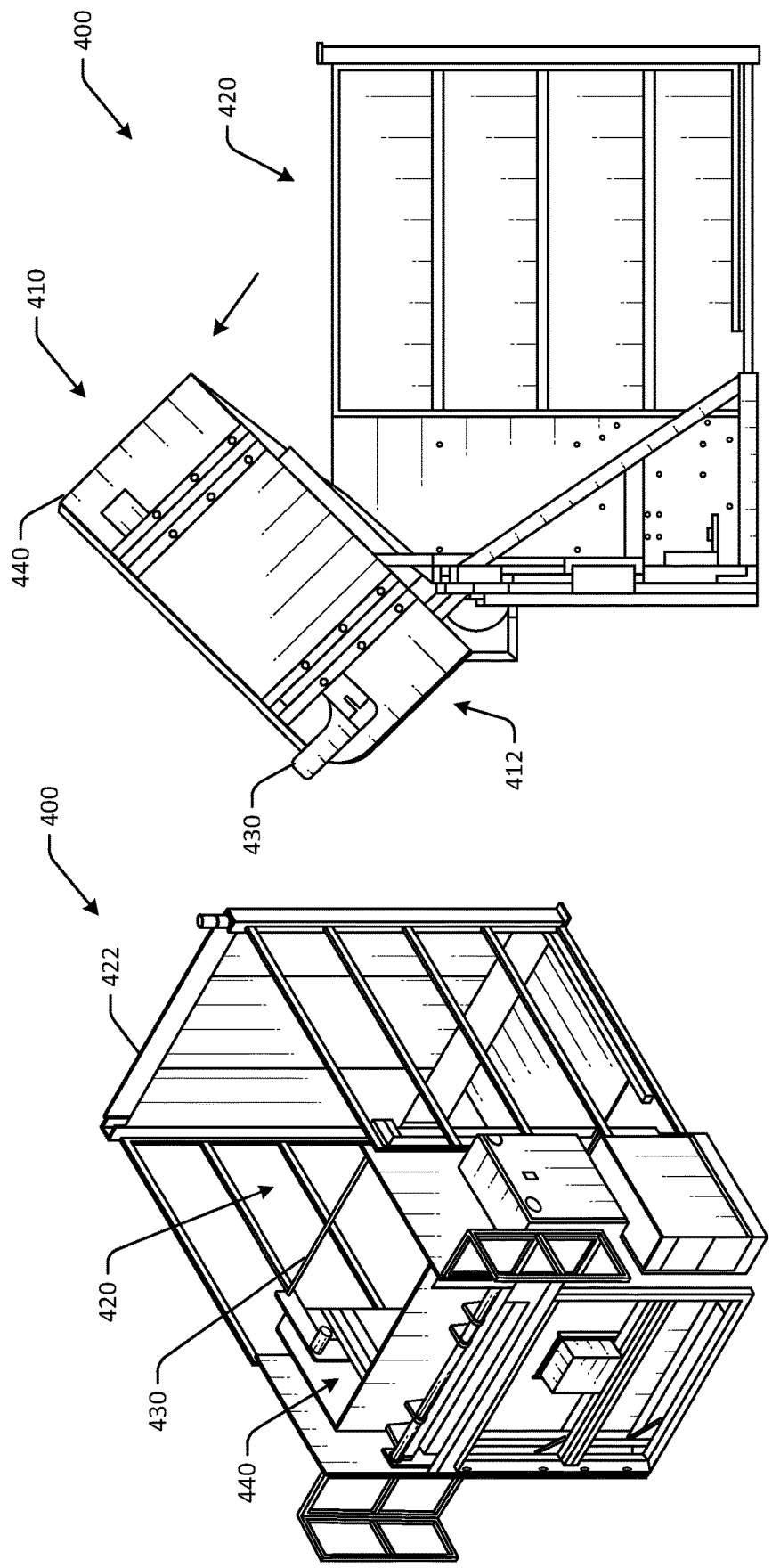
FIGS. 4A-4C are schematic illustrations of an example container unloading system in various views in accordance with one or more embodiments of the disclosure.
Figure 4B:
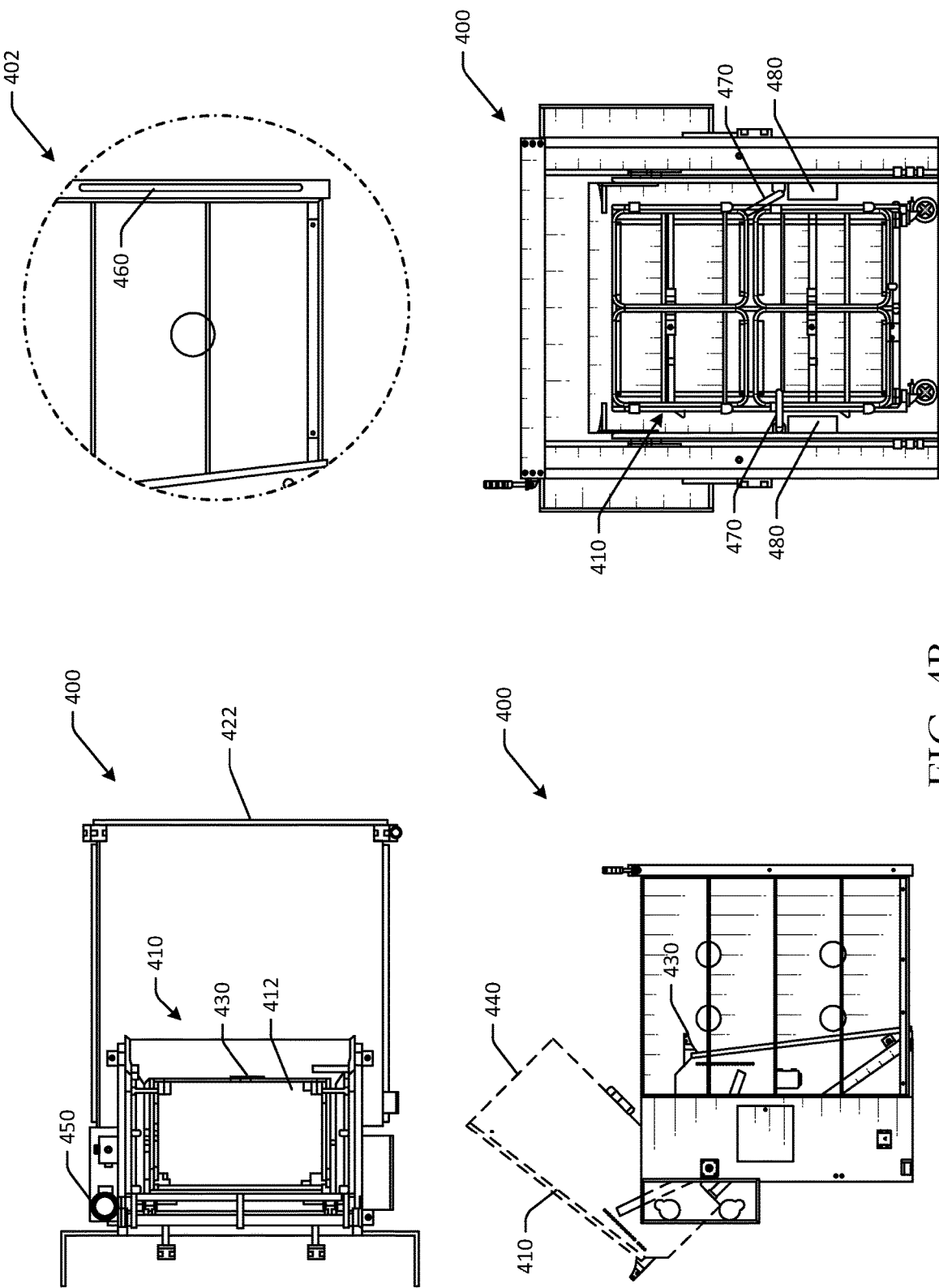
Figure 4C:
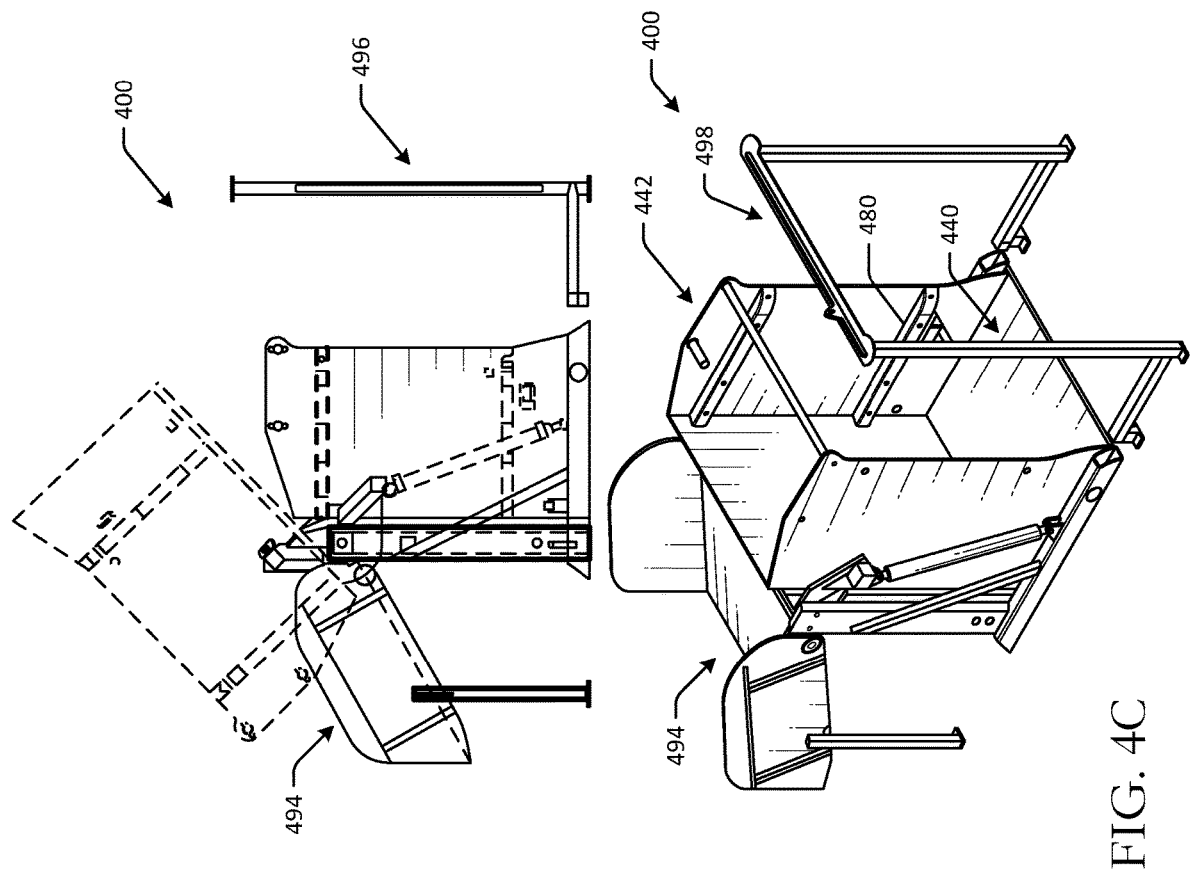
Figure 4C:
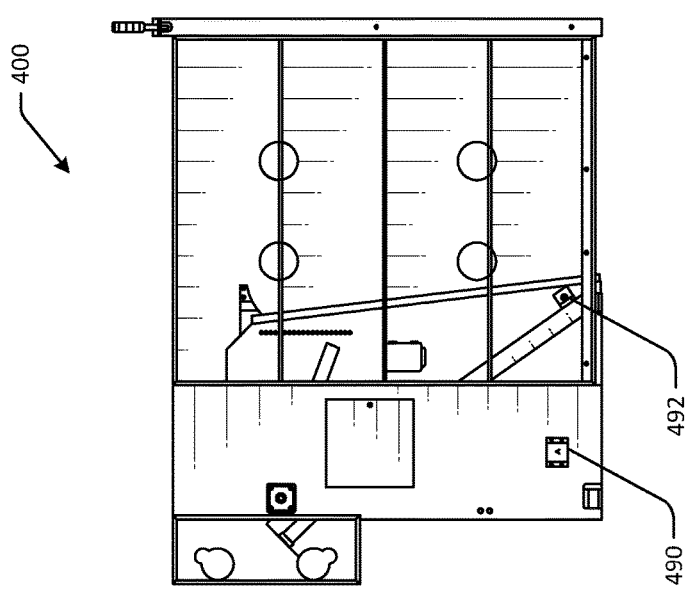

FIGS. 4A-4C are schematic illustrations of an example container unloading system 400 in various views in accordance with one or more embodiments of the disclosure. Other embodiments may include additional or fewer components. The illustrations of FIGS. 4A-4C may not be to scale, and may not be illustrated to scale with respect to other figures. The container unloading system illustrated in FIGS. 4A-4C may be the same container unloading system discussed with respect to FIGS. 1-3.

In FIG. 4A, the container unloading system 400 is depicted in perspective view without a container loaded inside the container unloading system 400, and in side view during a dumping operation with a container 410. The container unloading system 400 may include a secure area 420 that can be accessed via gate or door 422. The secure area 420 may be used to place containers 410 onto a platform 440 of the container unloading system 400 for unloading the container 410. The secure area 420 may be secured prior to initiation of a dumping operation. The container 410 may be secured on the platform 440 via one or more securing mechanisms 430, such as a bar with adjustable positioning that may prevent movement of the container 410 off the platform 440 during rotation. In some embodiments, the securing mechanism 430 may be automatically engaged based on a type of container loaded into the container unloading system 400. For example, the securing mechanism 430 may be engaged for containers having a certain height, depth, and/or width. In other embodiments, the securing mechanism 430 may be a bar that can be automatically actuated from a first position to a second position (e.g., via rotation of an arm to which the bar is coupled, etc.) to accommodate containers of different heights. For example, for relatively taller containers, the securing mechanism 430 may be actuated to a first position closer to a top of the container unloading system 400, so as to stop the container from sliding off the platform 440, whereas for relatively shorter containers, the securing mechanism 430 may be actuated to a second position closer to a bottom of the container unloading system 400, so as to reduce the amount of travel possible for the shorter container prior to contacting the securing mechanism 430.

In some embodiments, the container unloading system 400 may include the securing mechanism 430, which may minimize obstructions in the path of package rejection and allow multiple container heights in the container unloading system 400. The securing mechanism 430 may be actuated by a servo motor. At the start of the cycle, the retention bar or securing mechanism 430 would retract down to the correct height of the container. The bar stops in position based on the recipes programmed. The retainer would stay in place throughout the dumping cycle and would retract back to original position at the end of the cycle. This ensures that the container is not sliding in the dumper bucket in the fully tipped position, and prevents any damage to the containers and the dumper bucket.

For operator safety (when containers are manually loaded into the container unloading system 400 as opposed to automatically loaded), the dumping operation may not be initiated until the secure area 420 is secured, such as by closing the gate or door 422. In other embodiments, a light curtain and/or sensors 498 may be used to secure the secure area 420 instead of a physical gate or door, as shown in FIG. 4C. Similarly, light curtains and/or sensors 496 may be used instead of the cage surrounding the secure area 420 in the example of FIG. 4A. As the container 410 is rotated upwards and/or towards an inverted position (e.g., in the direction of the arrow shown in FIG. 4A) via the platform 440, items in an interior portion 412 of the container 410 may come out at least partially due to gravity, thereby resulting in the container 410 being unloaded.

The container unloading system 400 may be configured to unload various types of containers, including carts, Gaylords with or without pallets, cardboard containers, and so forth. As shown in FIG. 4C, the container unloading system 400 may have a dumper bucket 442 (of which the bottom may be the platform 440) that has a width great enough to accommodate different type of containers. In one example, the container unloading system 400 may have a dumper bucket with a width of at least 60 inches, so as to accommodate carts having a width of 50 inches, Gaylords having a width of 48 inches, and so forth, without creating pinch points. The container unloading system 400 may further reduce wheel jams and container tipping by providing adequate space for the wheels to rotate in an outward position in the dumper bucket.

In FIG. 4B, the container unloading system 400 is depicted in a top view. The container unloading system 400 may have a side-mounted hydraulic system 450 that may be configured to impart motion to the dumper bucket 442, so as to unload the container 410. The side-mounted hydraulic system 450 may save space and reduce a footprint of the container unloading system 400 relative to other positioning, such as a top-mounted or bottom-mounted hydraulic system. The hydraulic system 450 may be coupled to a variable frequency drive and motor, so as to vary speed of movement. For example, speed of movement may be selected based on a container type of a container that is loaded into the container unloading system 400.

As depicted in close-up side view 402, the container unloading system 400 may include one or more light curtain or other sensor systems 460 that may be used to detect the presence of objects. For example, the sensor system 460 may include a vertical and horizontal light curtain, and may be used to detect the presence of obstacles in non-permitted areas. Detection of obstacles may prevent movement of the container unloading system 400.

Also depicted in FIG. 4B is a side view of the container unloading system 400 during actuation and a front view of the container unloading system 400. The container unloading system 400 may include one or more container retention mechanisms 470. The container retention mechanism 470 may be automatically deployed depending on a container type loaded into the container unloading system 400. For example, the container retention mechanisms 470 may be moved from a vertical position to a horizontal position to secure a container on the dumper bucket 442 for containers having certain dimensions and/or based on sensor feedback (e.g., where sensors are used to detect container type).

The container unloading system 400 may include one or more centering guides 480 that may be used to guide the container 410 onto the platform 440, so as to reduce the likelihood of pinch points between container sidewalls and the sides of the dumper bucket 442. The centering guides 480 may have a plastic (e.g., Duraplast, etc.) or similar coating to eliminate metal to metal contact with the container and to reduce friction during loading and unloading of containers from the container unloading system 400.

The container unloading system 400 may include one or more sensors to detect or otherwise determine a container type of a container loaded into the container unloading system 400. In some embodiments, the container may have an identifier, such as an RFID tag, that can be detected by the container unloading system 400 to determine a container type of the container. In other embodiments, the container unloading system 400 may include a first sensor 490 and a second sensor 492 that may be used to determine container type, as illustrated in the side view of FIG. 4C. The first sensor 490 and the second sensor 492 may be photo eye sensors, proximity sensors, time of flight sensors, infrared sensors, camera sensors, and/or other types of sensors. The first sensor 490 may be used to determine the presence of a container and may prevent operation of the container unloading system 400 until an object is detected. The second sensor 492 may be used to determine whether to activate the container retention mechanism 470 and/or to execute a particular dumping operation (e.g., a particular speed of movement, a particular number of jogs or dumping actions, etc.). For example, if the second sensor 492 detects the container, the container unloading system 400 may determine a Gaylord has been loaded onto the container unloading system 400 and may not activate the container retention mechanism 470, whereas if no container is detected by the second sensor 492 (but a container is detected by the first sensor 490), the container type may be determined to be a cart, and the container retention mechanism 470 may be activated. In some embodiments, the centering guides 480 may be configured to move towards and away from a center of the dumper bucket 442, and may be actuated towards the center of the dumper bucket 442 when a certain type of container is detected.

The first sensor 490 may be located at or near a front of the container unloading system 400, and the second sensor 492 may be located at or near a rear of the container unloading system 400. The container retention mechanism 470 may prevent the cart or other container from tipping over or rolling out of the dumper bucket 442. As the container 410 is unloaded, some embodiments may optionally include a ramp 494 to guide items as the items are unloaded from the container, as depicted in side view and perspective view in FIG. 4C.

The container unloading system 400 may therefore include the platform 440, which may be a container support platform configured to rotate the container 410 from an upright position to an angled position. The angled position may be an inverted position, or may be a different position, such as a rotation of at least 90 degrees, a rotation of at least 100 degrees, a rotation of at least 110 degrees, a rotation of less than 180 degrees, and/or a different rotation amount. The container unloading system 400 may include one or more centering guides 480 configured to guide the container 410 onto the container support platform, and the side-mounted hydraulic device 450 configured to actuate the container support platform. The container unloading system 400 may include a controller configured to determine presence of the container on the container support platform, and to cause the container support platform to rotate the container via actuation of the side-mounted hydraulic device.

The centering guide 480 may have a plastic coating. In some embodiments, the centering guide 480 may be an active centering guide, and the container unloading system 400 may include an actuator configured to actuate the centering guide 480 from a flat position to an extended position, where the extended position is depicted in FIG. 4C (e.g., extended towards a center of the dumper bucket 442).

The container unloading system 400 may include the first sensor 490 disposed on a first side (e.g., a front side) of the container support platform, and the second sensor 492 disposed on a second side (e.g., a rear side) of the container support platform. The controller may be configured to determine a container type of the container 410 using feedback from at least one of the first sensor or the second sensor. For example, based on the dimensions of the container, one or both of the sensors may provide feedback that can be used to determine the container type. Other numbers of sensors and types of sensors can be used. In some embodiments, the container type can be selected from a metal container type or a cardboard container type. The controller may be configured to determine a speed of operation for the container support platform using the container type. For example, a speed of movement for Gaylords may be less than a speed of movement for metal carts.

In addition, the controller may cause different jog sequences or unloading sequences to be implemented based on container type. A jog sequence may include for example, forward rotation-backward rotation-forward rotation, so as to shake loose items that are stuck in the container. Another sequence may be forward rotation-backward rotation-forward rotation-backward rotation-forward rotation at varying speeds for one or all of the rotations to shake items loose. In some embodiments, the controller may be configured to determine that the container type is the metal container type, and cause the container support platform to implement a metal container dumping sequence, whereas in other embodiments the controller may determine that the container type is the cardboard container type, and cause the container support platform to implement a cardboard container dumping sequence.

The controller may be further configured to determine whether a container is improperly positioned on the container support platform using feedback from at least one of the first sensor or the second sensor. In another example, the controller may use feedback from a light curtain, where the controller may be configured to detect presence of an operator using the light curtain and pause operation of the container unloading system 400.

The container unloading system 400 may include the container retention device 470 that may be configured to secure the container 410 on or to the container support platform. The controller may be configured to determine that the container type is the metal container type, and cause the container retention device to be actuated. In other embodiments, the container retention device 470 may be actuated based on a detected container type.

Figure 5A:
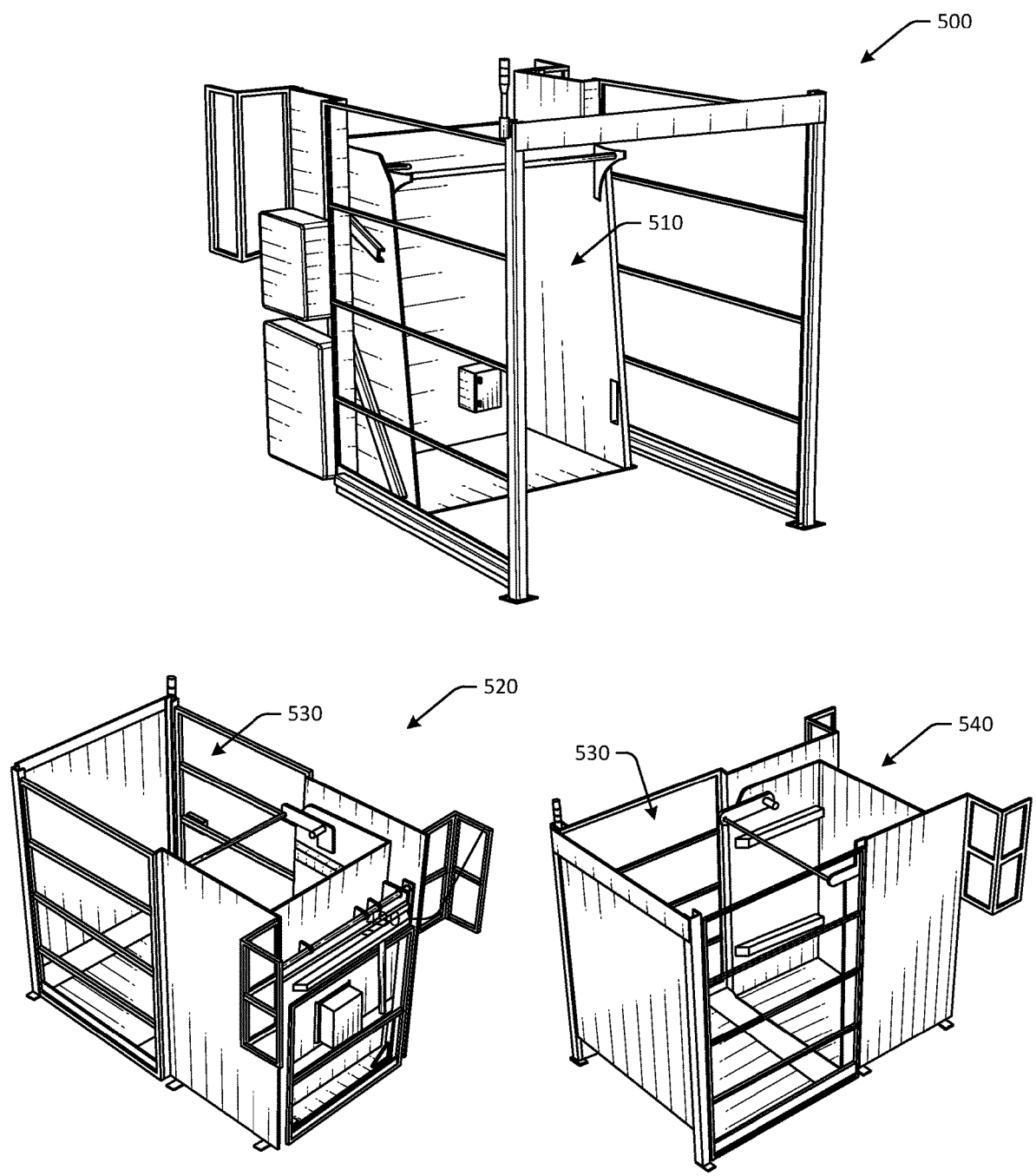
FIGS. 5A-5B are schematic illustrations of an example container unloading system in various views in accordance with one or more embodiments of the disclosure.
Figure 5B:
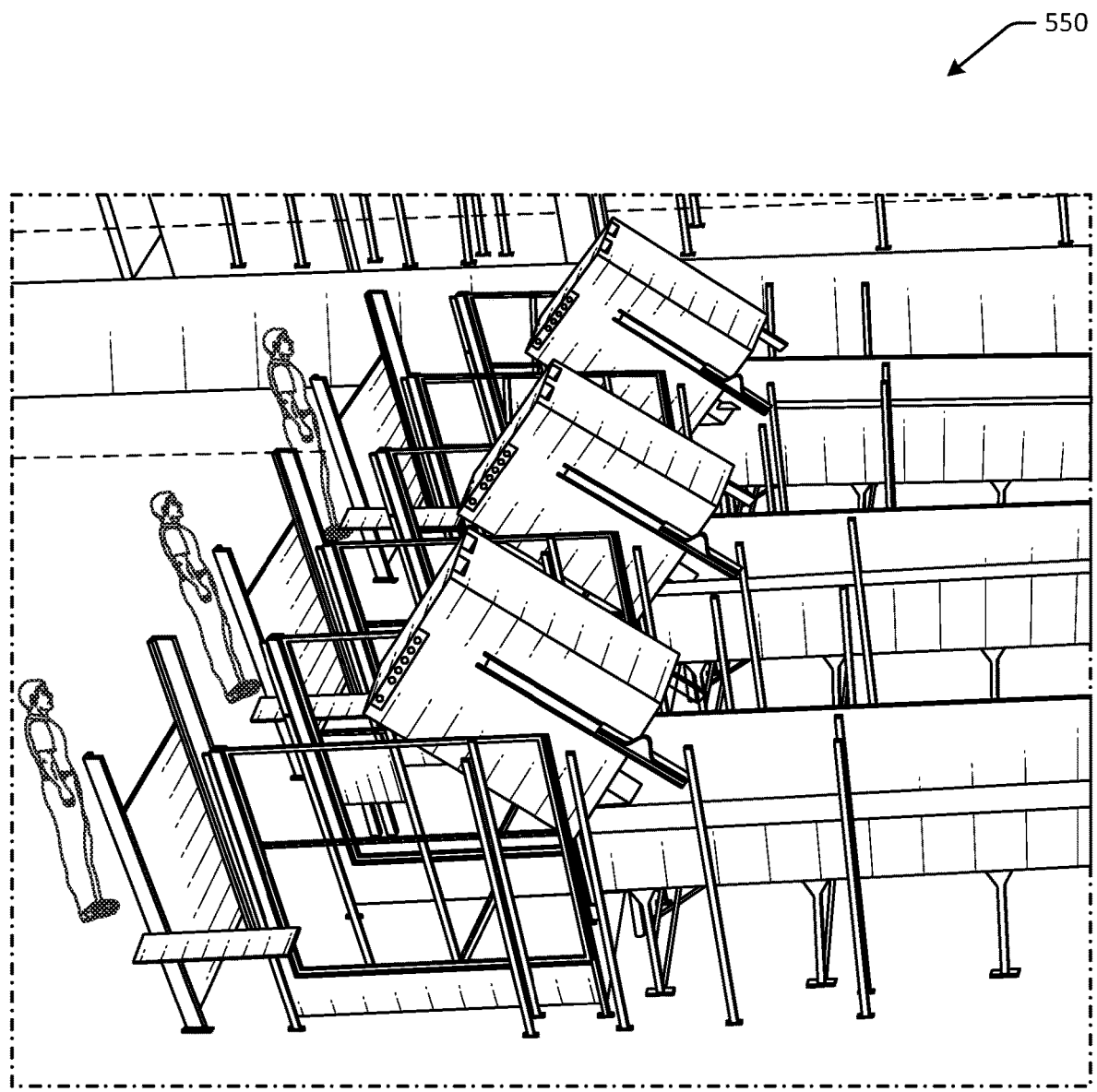

FIGS. 5A-5B are schematic illustrations of an example container unloading system 500 in various views in accordance with one or more embodiments of the disclosure. Other embodiments may include additional or fewer components. The illustrations of FIGS. 5A-5B may not be to scale, and may not be illustrated to scale with respect to other figures. The container unloading system illustrated in FIGS. 5A-5B may be the same container unloading system discussed with respect to FIGS. 1-4C.

In FIGS. 5A, the container unloading system 500 is depicted in various perspective views. In FIG. 5B, a plurality of container unloading systems 500 may be deployed in a facility 550 to provide enhanced flexibility and improved throughput. The container unloading system 500 may include a dumper bucket 540 configured to receive a container. The dumper bucket 540 may be configured to rotate the container from an upright position to an angled position. The dumper bucket 540 may include a platform 510 configured to support a lower portion of the container, and one or more centering guides coupled to the platform 510. The centering guide may be configured to guide the container onto the dumper bucket 540. The container unloading system 500 may include a first sensor coupled to a front side of the dumper bucket 540 and a second sensor coupled to a rear side of the dumper bucket 540. The container unloading system 500 may include a side-mounted hydraulic device coupled to the dumper bucket 540, where the dumper bucket 540 may be configured to rotate when the side-mounted hydraulic device is actuated.

The container unloading system 500 may be configured to unload various types of containers, such as metal cart containers having a first height and a first width, and cardboard containers having a second height and a second width that is less than the first width. The dumper bucket 540 may therefore have a third width that is at least 6 inches greater than the first width. The container unloading system 500 may include a rotatable container retention device (such as device 470 of FIG. 4B) coupled to the dumper bucket 540, where the rotatable container retention device configured to secure the container in the dumper bucket 540. The controller may be configured to determine that the type of container is the metal cart container, and cause the rotatable container retention device to rotate from an unsecured position to a secured position (e.g., from vertical to horizontal), where the rotatable container retention device remains in the unsecured position for cardboard container types.

One or more operations of the methods, process flows, or use cases of FIGS. 1-5B may have been described above as being performed by a user device, or more specifically, by one or more program module(s), applications, or the like executing on a device. It should be appreciated, however, that any of the operations of the methods, process flows, or use cases of FIGS. 1-5B may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-5B may be described in the context of the illustrative devices, it should be appreciated that such operations may be implemented in connection with numerous other device configurations.

The operations described and depicted in the illustrative methods, process flows, and use cases of FIGS. 1-5B may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-5B may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 6:
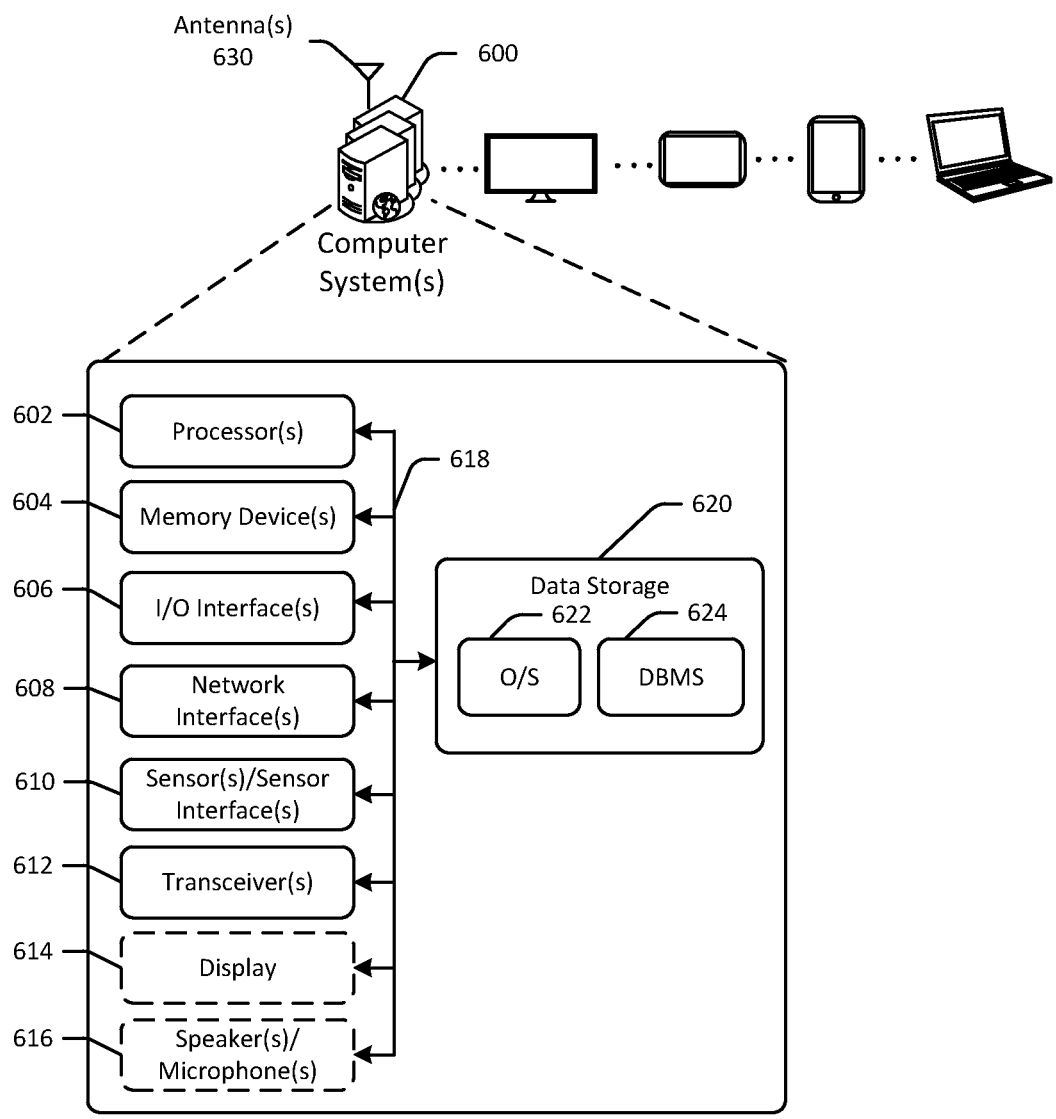
FIG. 6 schematically illustrates an example architecture of a computer system associated with a container unloading system in accordance with one or more embodiments of the disclosure.

FIG. 6 is a schematic block diagram of one or more illustrative computer system(s) 600 in accordance with one or more example embodiments of the disclosure. The computer system(s) 600 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 600 may correspond to an illustrative device configuration for a computer system used in conjunction with any one of the container unloading system(s) of FIGS. 1-5B, such as container dumpers or unloaders.

The computer system(s) 600 may be configured to communicate with one or more servers, user devices, or the like. The computer system(s) 600 may be configured to cause the container unloading system(s) to implement certain unloading sequences, determine container types, unload containers, and so forth.

The computer system(s) 600 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 600 may include one or more processors (processor(s)) 602, one or more memory devices 604 (also referred to herein as memory 604), one or more input/output (I/O) interface(s) 606, one or more network interface(s) 608, one or more sensor(s) or sensor interface(s) 610, one or more transceiver(s) 612, one or more optional display(s) 614, one or more optional microphone(s) 616, and data storage 620. The computer system(s) 600 may further include one or more bus(es) 618 that functionally couple various components of the computer system(s) 600. The computer system(s) 600 may further include one or more antenna(s) 630 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 618 may include at least one of a system bus, a memory bus, an address bus, or a message bus, and may permit the exchange of information (e.g., data (including computer-executable code), signaling, etc.) between various components of the computer system(s) 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 604 of the computer system(s) 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to the memory 604 for use by the processor(s) 602 during the execution of the computer-executable instructions. Moreover, output data generated as a result of execution of the computer-executable instructions by the processor(s) 602 may be stored initially in the memory 604, and may ultimately be copied to the data storage 620 for non-volatile storage.

More specifically, the data storage 620 may store one or more operating systems (O/S) 622; one or more database management systems (DBMS) 624; and one or more program module(s), applications, engines, computer-executable code, scripts, or the like. Some or all of these module(s) may be sub-module(s). Any of the components depicted as being stored in the data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in the data storage 620 may support functionality described in reference to corresponding components named earlier in this disclosure.

The data storage 620 may further store various types of data utilized by the components of the computer system(s) 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 602 may be configured to access the memory 604 and execute the computer-executable instructions loaded therein. For example, the processor(s) 602 may be configured to execute the computer-executable instructions of the various program module(s), applications, engines, or the like of the computer system(s) 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to other illustrative components depicted as being stored in the data storage 620, the O/S 622 may be loaded from the data storage 620 into the memory 604 and may provide an interface between other application software executing on the computer system(s) 600 and the hardware resources of the computer system(s) 600. More specifically, the O/S 622 may include a set of computer-executable instructions for managing the hardware resources of the computer system(s) 600 and for providing common services to other application programs (e.g., managing memory allocation among various application programs). In certain example embodiments, the O/S 622 may control execution of the other program module(s). The O/S 622 may include any operating system now known or which may be developed in the future including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 600 is a mobile device, the DBMS 624 may be any suitable lightweight DBMS optimized for performance on a mobile device.

Referring now to other illustrative components of the computer system(s) 600, the input/output (I/O) interface(s) 606 may facilitate the receipt of input information by the computer system(s) 600 from one or more I/O devices as well as the output of information from the computer system(s) 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(s) 630 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 600 may further include one or more network interface(s) 608 via which the computer system(s) 600 may communicate with any of a variety of other systems, platforms, networks, devices, and so forth. The network interface(s) 608 may enable communication, for example, with one or more wireless routers, one or more host servers, one or more web servers, and the like via one or more networks.

The antenna(s) 630 may include any suitable type of antenna depending, for example, on the communications protocols used to transmit or receive signals via the antenna(s) 630. Non-limiting examples of suitable antennas may include directional antennas, non-directional antennas, dipole antennas, folded dipole antennas, patch antennas, multiple-input multiple-output (MIMO) antennas, or the like. The antenna(s) 630 may be communicatively coupled to one or more transceivers 612 or radio components to which or from which signals may be transmitted or received.

As previously described, the antenna(s) 630 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 630 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 630 may be configured to transmit or receive radio frequency signals within any suitable frequency range forming part of the unlicensed portion of the radio spectrum.

The antenna(s) 630 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(s) 630—transmitting or receiving radio frequency (RF) signals in the bandwidth and/or channels corresponding to the communications protocols utilized by the computer system(s) 600 to communicate with other devices. The transceiver(s) 612 may include hardware, software, and/or firmware for modulating, transmitting, or receiving—potentially in cooperation with any of antenna(s) 630—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the computer system(s) 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 614 may be configured to output light and/or render content. The optional speaker(s)/microphone(s) 616 may be any device configured to receive analog sound input or voice data.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 600, and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the computer system(s) 600 may include alternate and/or additional hardware, software, or firmware components beyond those described or depicted without departing from the scope of the disclosure. More particularly, it should be appreciated that software, firmware, or hardware components depicted as forming part of the computer system(s) 600 are merely illustrative and that some components may not be present or additional components may be provided in various embodiments. While various illustrative program module(s) have been depicted and described as software module(s) stored in the data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-5B may be performed by a device having the illustrative configuration depicted in FIG. 6, or more specifically, by one or more engines, program module(s), applications, or the like executable on such a device. It should be appreciated, however, that such operations may be implemented in connection with numerous other device configurations.

The operations described and depicted in the illustrative methods and process flows of any of FIGS. 1-5B may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-5B may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A container unloading system comprising:
    a dumper bucket configured to receive a container, wherein the dumper bucket is configured to rotate the container from an upright position to an angled position, the dumper bucket comprising a platform configured to support a lower portion of the container;
    a centering guide coupled to the platform, the centering guide configured to guide the container onto the dumper bucket;
    a first sensor coupled to a front side of the dumper bucket;
    a second sensor coupled to a rear side of the dumper bucket;
    a side-mounted hydraulic device coupled to the dumper bucket, wherein the dumper bucket is configured to rotate when the side-mounted hydraulic device is actuated; and
    a controller configured to:
        determine a type of container in the dumper bucket using feedback from the first sensor and the second sensor; and
        cause the dumper bucket to rotate the container via actuation of the side-mounted hydraulic device;

wherein items inside the container are unloaded when the container is rotated from the upright position to the angled position.

2. The container unloading system of claim 1, wherein the container unloading system is configured to unload metal cart containers having a first height and a first width, and cardboard containers having a second height and a second width that is less than the first width;
   wherein the dumper bucket has a third width that is at least 6 inches greater than the first width.

3. The container unloading system of claim 2, further comprising:
   a rotatable container retention device coupled to the dumper bucket, the rotatable container retention device configured to secure the container in the dumper bucket;
   wherein the controller is further configured to:
      determine that the type of container is the metal cart container; and
      cause the rotatable container retention device to rotate from an unsecured position to a secured position, wherein the rotatable container retention device remains in the unsecured position for cardboard container types.

4. The container unloading system of claim 2, wherein the centering guide is an active centering guide, the container unloading system further comprising:
   an actuator configured to actuate the centering guide from a flat position to an extended position;
   wherein the controller is further configured to:
      determine that the type of container is the metal cart container; and
      cause the actuator to actuate the centering guide to the extended position to guide the metal cart container.

5. A container unloading system comprising:
   a container support platform configured to rotate a container from an upright position to an angled position;
   a centering guide configured to guide the container onto the container support platform;
   a hydraulic device configured to actuate the container support platform; and
   a controller configured to:
      determine presence of the container on the container support platform; and
      cause the container support platform to rotate the container via actuation of the hydraulic device.

6. The container unloading system of claim 5, further comprising:
   a first sensor disposed on a first side of the container support platform; and
   a second sensor disposed on a second side of the container support platform;
   wherein the controller is further configured to:
      determine a container type of the container using feedback from at least one of the first sensor or the second sensor.

7. The container unloading system of claim 6, wherein the controller is further configured to:
   determine a speed of operation for the container support platform using the container type.

8. The container unloading system of claim 6, wherein the container type is a metal container type or a cardboard container type.

9. The container unloading system of claim 8, further comprising:
   a container retention device configured to secure the container to the container support platform;
   wherein the controller is further configured to:
      determine that the container type is the metal container type; and
      cause the container retention device to be actuated.

10. The container unloading system of claim 8, wherein the controller is further configured to:
    determine that the container type is the metal container type; and
    cause the container support platform to implement a metal container dumping sequence.

11. The container unloading system of claim 8, wherein the controller is further configured to:
    determine that the container type is the cardboard container type; and
    cause the container support platform to implement a cardboard container dumping sequence.

12. The container unloading system of claim 5, further comprising:
    a first sensor disposed on a first side of the container support platform; and
    a second sensor disposed on a second side of the container support platform;
    wherein the controller is further configured to:
       determine that the container is improperly positioned on the container support platform using feedback from at least one of the first sensor or the second sensor.

13. The container unloading system of claim 5, further comprising:
    a light curtain;
    wherein the controller is further configured to:
       detect presence of an operator using the light curtain.

14. The container unloading system of claim 5, wherein the centering guide is an active centering guide, the container unloading system further comprising:
    an actuator configured to actuate the centering guide from a flat position to an extended position.

15. The container unloading system of claim 5, further comprising:
    a securing mechanism configured to be actuated from a first position to a second position, wherein the securing mechanism prevents the container from sliding off the container support platform.

16. The container unloading system of claim 5, wherein the hydraulic device is a side-mounted hydraulic device, and wherein the angled position is an inverted position.

17. A container unloading device comprising:
    a container support platform configured to rotate a container from an upright position to an angled position;
    a centering guide configured to guide the container onto the container support platform, wherein the centering guide comprises a plastic coating;
    a side-mounted hydraulic device configured to actuate the container support platform;
    a first sensor disposed on a first side of the container support platform; and
    a controller configured to:
       determine presence of the container on the container support platform using the first sensor; and
       cause the container support platform to rotate the container via actuation of the side-mounted hydraulic device.

18. The container unloading device of claim 17, further comprising:
    a second sensor disposed on a second side of the container support platform;

wherein the controller is further configured to:
   determine a container type of the container using feedback from at least one of the first sensor or the second sensor.

19. The container unloading device of claim 18, wherein the controller is further configured to:
   determine a speed of operation for the container support platform using the container type.

20. The container unloading device of claim 18, wherein the container type is a metal container type or a cardboard container type.

* * * * *